(12) United States Patent
Ananthapur Bache et al.

(10) Patent No.: US 11,688,281 B2
(45) Date of Patent: Jun. 27, 2023

(54) DETERMINING SHELTER AREAS FOR TWO-WHEELER VEHICLES

(71) Applicant: International Business Machines Corporation, Armonk, NY (US)

(72) Inventors: Vijay Kumar Ananthapur Bache, Bangalore (IN); Manish Anand Bhide, Hyderabad (IN); Jhilam Bera, Bangalore (IN); Sowmya V. Kollipara, Hyderabad (IN)

(73) Assignee: International Business Machines Corporation, Armonk, NY (US)

(*) Notice: Subject to any disclaimer, the term of this patent is extended or adjusted under 35 U.S.C. 154(b) by 248 days.

(21) Appl. No.: 17/104,691

(22) Filed: Nov. 25, 2020

(65) Prior Publication Data
US 2022/0165157 A1    May 26, 2022

(51) Int. Cl.
*G08G 1/14* (2006.01)
*G01S 19/42* (2010.01)
(Continued)

(52) U.S. Cl.
CPC ........ *G08G 1/145* (2013.01); *G01C 21/3492* (2013.01); *G01C 21/3661* (2013.01); *G01C 21/3691* (2013.01); *G01S 19/42* (2013.01); *G08G 1/0104* (2013.01); *G08G 1/015* (2013.01); *G08G 1/017* (2013.01); *G08G 1/144* (2013.01); *G08G 1/146* (2013.01)

(58) Field of Classification Search
CPC ...... G08G 1/145; G08G 1/0104; G08G 1/015; G08G 1/017; G08G 1/144; G08G 1/146; G01C 21/3492; G01C 21/3661; G01C 21/3691; G01S 19/42
See application file for complete search history.

(56) References Cited

U.S. PATENT DOCUMENTS

| | | | | |
|---|---|---|---|---|
| 5,537,110 A | * | 7/1996 | Iida | G08G 1/04 340/933 |
| 7,579,945 B1 | * | 8/2009 | Richter | G08B 25/14 340/506 |

(Continued)

FOREIGN PATENT DOCUMENTS

| JP | 2003168179 A | 6/2003 |
|---|---|---|
| KR | 20190100103 A | 8/2019 |
| WO | 2012138752 A2 | 10/2012 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

*Primary Examiner* — Dale W Hilgendorf
(74) *Attorney, Agent, or Firm* — Richard B. Thomas

(57) ABSTRACT

Embodiments relate to a system, computer program product, and method for determining shelter areas for two-wheeler vehicles, and, more specifically, for dynamically distinguishing the behavior of two-wheeler vehicles and non-two-wheeler vehicles as an indicator of shelter areas from inclement weather. The behavior of the vehicles is distinguished through a plurality of two-wheeler vehicles slowing down and congregating at a particular location as a shelter against inclement weather, while non-two-wheeler vehicles may slow down, however, not stop proximate this location.

20 Claims, 7 Drawing Sheets

| #Shelter | Distance from the shelter | Speed of user | Road condition (dry/wet) | Shelter Capacity from historical data | # GPS data | Rain prediction | Suggestion |
|---|---|---|---|---|---|---|---|
| 1 | 1 km | 30 km/h | Dry | 30 m² | 20 | 20% after 1.5 hours | Rank #2 |
| 2 | 1.5 km | 25 km/h | Dry | 50 m² | 10 | 30% after 0.5 hours | Rank #1 |

(51) Int. Cl.
  *G01C 21/36* (2006.01)
  *G01C 21/34* (2006.01)
  *G08G 1/01* (2006.01)
  *G08G 1/017* (2006.01)
  *G08G 1/015* (2006.01)

(56) References Cited

U.S. PATENT DOCUMENTS

| | | | | |
|---|---|---|---|---|
| 8,300,560 | B2 * | 10/2012 | Nowlan | H04W 4/90 |
| | | | | 455/404.1 |
| 8,422,987 | B2 * | 4/2013 | Kane | H04W 76/50 |
| | | | | 340/690 |
| 9,171,446 | B2 * | 10/2015 | Araiz-Boys | G08B 25/12 |
| 9,299,245 | B2 * | 3/2016 | Vartiainen | G08B 27/005 |
| 11,062,602 | B1 * | 7/2021 | Beaurepaire | G08G 1/146 |
| 11,341,433 | B2 * | 5/2022 | Lakshminarayanan | ......... |
| | | | | H04W 4/90 |
| 2015/0206330 | A1 | 7/2015 | Takechi | |
| 2016/0284038 | A1 | 9/2016 | Johnson | |
| 2017/0023369 | A1 * | 1/2017 | Mohler | G01C 21/206 |
| 2019/0005739 | A1 * | 1/2019 | Gazlay | G06Q 30/0645 |
| 2019/0145787 | A1 * | 5/2019 | Akselrod | G05D 1/0214 |
| | | | | 701/26 |
| 2021/0158233 | A1 * | 5/2021 | Lakshminarayanan | ......... |
| | | | | G08G 1/096844 |

* cited by examiner

DETERMINING SHELTER AREAS FOR TWO-WHEELER VEHICLES

BACKGROUND

The present disclosure relates to determining shelter areas for two-wheeler vehicles, and, more specifically, for dynamically distinguishing the behavior of two-wheeler vehicles and non-two-wheeler vehicles as an indicator of shelter areas from inclement weather.

In many geographical regions, transportation is prevalent, for both business and pleasure. Such transportation for pleasure typically occurs on publicly-available thoroughfares being used for business and other reasons as well. Therefore, two-wheeler vehicles, including, without limitation, motorcycles, are popular vehicles for extended traveling, especially along thoroughfares such as highways and expressways where two-wheeler vehicles are travelling with four-wheeler vehicles (cars, minivans, busses, small trucks, etc.) and large trucks, e.g., 18-wheeler trucks. The smaller two-wheeler vehicles are more vulnerable to inclement weather conditions than the larger vehicles due to the exposure of the riders of the two-wheeler vehicles to the elements. Accordingly, riders of two-wheeler vehicles are more inclined to stop and find shelter from inclement weather conditions than the riders in the larger vehicles are.

In addition, mobile phones are ubiquitous and the users typically have the global positioning system (GPS) features turned on. Moreover, many known associated mobile phone operating systems have features, i.e., travel apps, that facilitate capturing information about the mode of transport being used by the mobile phone users. For example, such known mobile phone apps will ask if a user uses a four-wheeler, a two-wheeler, or public transport to commute.

SUMMARY

A system, computer program product, and method are provided for determining shelter areas for two-wheeler vehicles, and, more specifically, for dynamically distinguishing the behavior of two-wheeler vehicles and non-two-wheeler vehicles as an indicator of shelter areas from inclement weather.

In one aspect, a computer system is provided to determine shelter areas for two-wheeler vehicles, and, more specifically, for dynamically distinguishing the behavior of two-wheeler vehicles and non-two-wheeler vehicles as an indicator of shelter areas from inclement weather. The computer system includes one or more processing devices and one or more memory devices communicatively coupled to the one or more processing devices. The system also includes a knowledge base communicatively coupled to the one or more processing devices and the one or more memory devices. The knowledge base and the one or more memory devices are communicatively coupled to a plurality of positioning devices, each positioning device of the plurality of positioning devices is associated with one of a two-wheeler vehicle and a non-two-wheeler vehicle. The knowledge base is configured to receive location information from the plurality of positioning devices. The one or more processors are configured to use the location information to determine a first location. A plurality of first two-wheeler vehicles are proximate the first location. A first status of the plurality of first two-wheeler vehicles is the plurality of first two-wheeler vehicles are not moving. The processor is also configured to use the location information to determine that a second status of a plurality of non-two-wheeler vehicles is one or more non-two-wheeler vehicles of the plurality of non-two-wheeler vehicles is moving proximate the first location. The processor is further configured to determine, subject to the first status and the second status, the first location is a shelter from inclement weather. The processor is also configured to use at least a portion of the collected data resident within the knowledge base to identify inclement weather proximate the first location.

In another aspect, a computer program product is provided to determine shelter areas for two-wheeler vehicles, and, more specifically, for dynamically distinguishing the behavior of two-wheeler vehicles and non-two-wheeler vehicles as an indicator of shelter areas from inclement weather. The computer program product includes one or more computer readable storage media and program instructions collectively stored on the one or more computer-readable storage media. The program instructions includes program instructions to use location information transmitted from a plurality of positioning devices to determine a first location. A plurality of first two-wheeler vehicles are proximate the first location. The product also includes program instructions to use the location information to determine that a first status of the plurality of first two-wheeler vehicles is the plurality of first two-wheeler vehicles is not moving. The product further includes program instructions to use the location information to determine that a second status of a plurality of non-two-wheeler vehicles is one or more non-two-wheeler vehicles of the plurality of non-two-wheeler vehicles are moving proximate the first location. The product also includes program instructions to determine, subject to the first status and the second status, the first location is a shelter from inclement weather. The product further includes program instructions to use at least a portion of collected data resident within a knowledge base to identify inclement weather proximate the first location.

In yet another aspect, a computer-implemented method to determine shelter areas for two-wheeler vehicles, and, more specifically, for dynamically distinguishing the behavior of two-wheeler vehicles and non-two-wheeler vehicles as an indicator of shelter areas from inclement weather. The method includes using location information transmitted from a plurality of positioning devices to determine a plurality of first two-wheeler vehicles are proximate a first location. The method also includes determining that a first status of the plurality of first two-wheeler vehicles is the plurality of first two-wheeler vehicles is not moving. The method further includes using the location information to determine that a second status of a plurality of non-two-wheeler vehicles is one or more non-two-wheeler vehicles of the plurality of non-two-wheeler vehicles is moving proximate the first location. The method also includes determining, subject to the first status and the second status, the first location is a shelter from inclement weather. The method further includes using at least a portion of collected data resident within a knowledge base to identify inclement weather proximate the first location.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
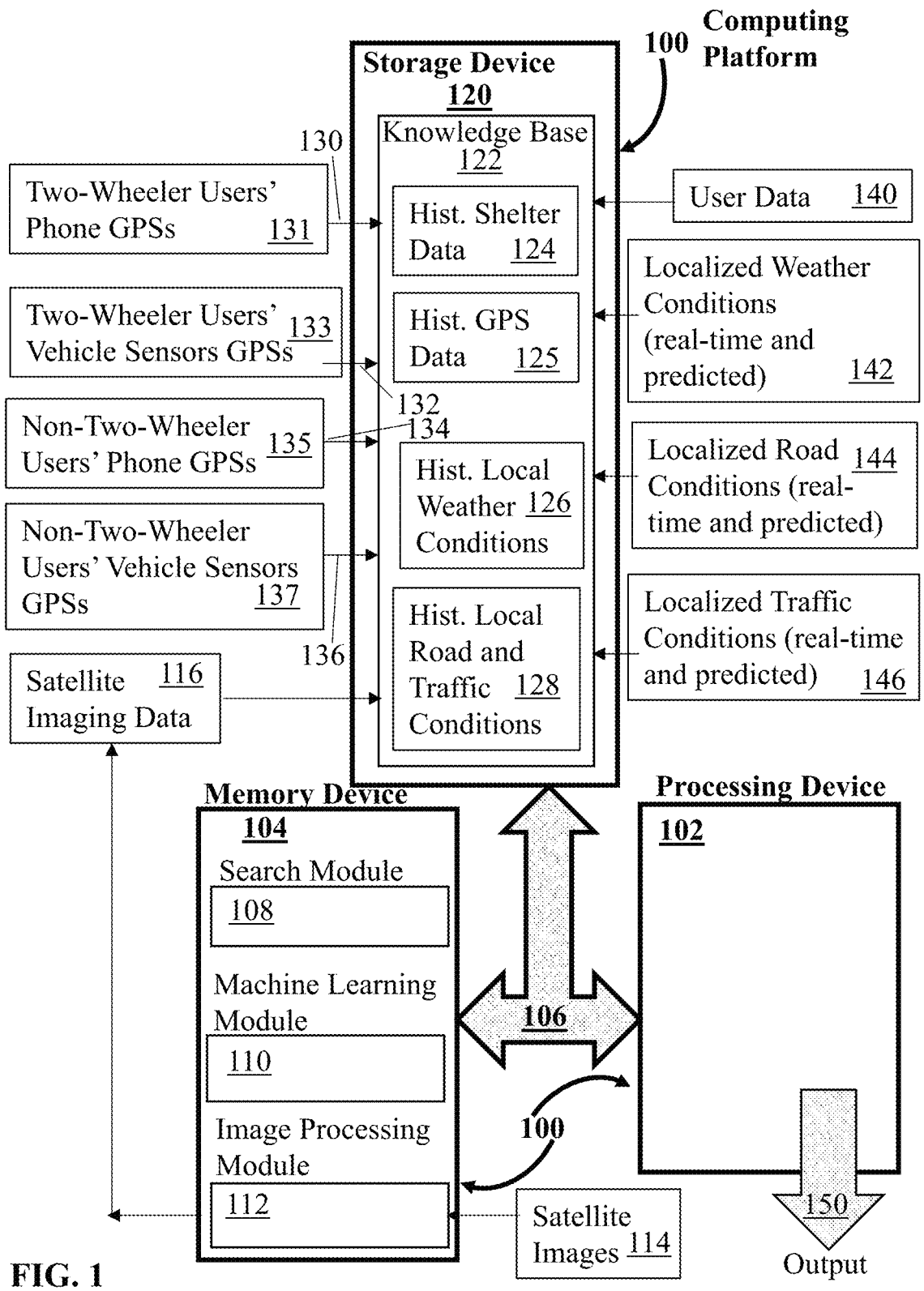
FIG. 1 is a schematic diagram illustrating a portion of a computing platform suitable for determining shelter areas for two-wheeler vehicles, and, more specifically, for dynamically distinguishing the behavior of two-wheeler vehicles and non-two-wheeler vehicles as an indicator of shelter areas from inclement weather, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Two-wheeler vehicles, including, without limitation, motorcycles, are popular vehicles for traveling, especially along thoroughfares such as highways and expressways where two-wheeler vehicles are travelling with four-wheeler vehicles and large trucks with more than four wheels. The smaller two-wheeler vehicles are more vulnerable to inclement weather conditions than the larger vehicles due to the exposure of the riders of the two-wheeler vehicles to the elements. Typically, riders of two-wheeler vehicles will seek shelter from inclement weather conditions such as sudden rain storms under overpasses, which provide at least some protection in rain conditions. However, these overpasses provide little protection in high-wind and driving rain conditions, for example. Accordingly, riders of two-wheeler vehicles are more inclined to stop and find shelter from inclement weather conditions rather than the riders in the larger vehicles.

In addition, mobile phones are ubiquitous and many users typically have the global positioning system (GPS) features turned on. Moreover, many known associated mobile phone operating systems have features, i.e., travel apps, that facilitate capturing information about the mode of transport being used by the mobile phone users. For example, such known mobile phone apps will ask if a user uses a four-wheeler, a two-wheeler, or public transport to commute. Furthermore, many modern vehicles, regardless of the number of wheels, have GPS devices embedded therein that are typically engaged. While this disclosure refers to mobile phones, the embodiments of this disclosure may extend to other portable computing devices, including, without limitation, tablets, with the stipulation that the mobile computing device of choice should be compatible with riding a two-wheeler vehicle.

A system, computer program product, and method are disclosed and described herein for determining shelter areas for two-wheeler vehicles, and, more specifically, for dynamically distinguishing the behavior of two-wheeler vehicles and non-two-wheeler vehicles as an indicator of shelter areas from inclement weather.

In at least one embodiment, shelter location information is collected for each region for which the system of this disclosure will be present. Shelters may include, without limitation, underpasses, publicly available rest areas (such as those frequently found along US Interstate highways), publicly available parks with protective structures, and commercially available structures such as restaurants. The shelter information collected will be specific to two-wheeler vehicles due to the special considerations with respect to the exposure of the riders to the elements. At least a portion of the shelter information collected and stored will include, without limitation, historical data such as previous use by drivers of two-wheeler vehicles. In at least one embodiment, at least a portion of the information is provided by historical GPS data collected from one or more of the user's mobile phones and GPS devices on the two-wheeler vehicles. The shelter information will also include infrastructure data such as, and without limitation, human capacity, vehicle capacity, amenities (e.g., vending machines, rest facilities), user ratings and comments, and weather protection details (e.g., enclosures). Moreover, historical shelter data may be captured through satellite images collected and stored in the system. In at least some embodiments, an image processing module can identify shelter locations during adverse weather conditions through analysis of satellite images taken closer to real-time. A machine learning module may assist in determining the optimum shelter for the conditions. Accordingly, potential shelter locations for two-wheeler drivers available for sheltering two-wheel drivers from inclement weather are identified by the system described herein based on a predetermined set of known shelters.

Also, in at least some embodiments, localized weather conditions are used to provide the riders of the two-wheeler vehicles information with respect to any potential inclement weather conditions for the immediate vicinity and for a predetermined distance based on user preferences. The weather information is determined through historical weather data collected and stored by the system, real-time weather conditions, and weather predictions from one or more sources including, without limitation, localized and national weather services, commercially available weather reporting outlets (e.g., local commercial radio stations), and mobile phone-based weather apps. In addition, in some embodiments, localized road and traffic conditions (historical, real-time, and predicted) are collected from sources similar to those for the weather as well as data collected from users' and vehicles' sensors within a predetermined time frame prior to the present time. The machine learning module may assist in the weather, road, and traffic conditions determinations. Accordingly, one mechanism for determining potential inclement weather conditions includes accessing data from available weather sources and determining the inclement weather potentials from the data.

Moreover, in at least some embodiments, the system includes features configured to determine potential shelters for the respective two-wheeler users based on the determined weather conditions, road conditions, traffic conditions, and details of the shelter, including the distance to each of the potential shelters and the time to reach the shelters based on current and predicted speeds of the respective two-wheeler vehicles. In addition to determining the potential shelters, in some embodiments, the system will provide recommendations in the form of rankings of the shelters if there is more than one available. The list of potential shelters may be provided based on a request from the users or based on an alert from the mobile app.

Further, in at least some embodiments, subject to the collected real-time data from two-wheeler users' mobile phone GPS', two-wheeler vehicles sensor GPSs, non-two-wheeler users' phone GPSs, and non-two-wheeler users' vehicle GPS sensors, the system disclosed herein can determine if the two-wheeler vehicles are collecting in a predetermined vicinity to suggest that inclement weather, e.g., rain, is present in that vicinity. Moreover, if the non-two-wheel vehicles are merely slowing down in the same vicinity, without stopping, further suggestion of inclement weather is provided to the user. Moreover, the proximate location of the congregation of the two-wheeler vehicles is indicative of an established shelter area where operators to the two-wheeler vehicles have determined to be relatively safe from the inclement weather. As described herein, these locations can be stored for future use in notifying other drivers of two-wheeler vehicles of their availability.

The presence of inclement weather proximate the associated vicinity may be further determined through a request from the user's mobile phone to request other users to verify the presence of the inclement weather automatically, without direct user operation. Such determinations of inclement weather includes time-stamping the data as it collected such that there are both proximal and temporal relationships between the data. Therefore, the existing and pending number of users at the shelters can be determined and approximated, accordingly, and the ranking of the proposed shelters may be adjusted accordingly. The users can choose the shelters, with the system suggesting the best shelter from available shelters proximate the users. The machine learning module includes features that cause the system to learn from the behaviors and choices of the users. Accordingly, proximal and temporal data collected from a plurality of users of two-wheeler vehicles are distinguished from the data collected from the other vehicles to establish the possibility of inclement weather conditions that might require the users to find a shelter.

Referring to FIG. 1, a schematic diagram illustrating a portion of a computing platform 100, i.e., a computing system 100 suitable for determining shelter areas for two-wheeler vehicles through dynamically determining inclement weather, and further dynamically determining navigation and shelter information in view of the inclement weather. The computing system 100 is configured with one or more processing devices 102 (only one shown) in communication with one or more memory devices 104 (only one shown) across a bus 106. The computing system 100 also includes a search module 108 resident within the memory device 104. The search module 108 is configured to be triggered by at least one of a query by a user and an alert from one or more mobile applications when inclement weather is either predicted or empirically determined, and the search module 108 will initiate additional data collection therein to determine the available shelters. The search module 108 is discussed further herein.

The computing system 100 further includes a machine learning module 110 embedded within the memory device 104. In the illustrated embodiment, the machine learning module 110 is a stand-alone module. In at least some embodiments, the machine learning module 110 is embedded within a cognitive agent, such as, and without limitation, an artificial intelligence platform. The machine learning module 110 is configured to learn how to integrate the data to provide recommendations for shelters to the users over time, how to continue to learn through observation of the users' behaviors once the shelter suggestions have been made, learn how to improve the ability to recommend shelters, and to rank the recommended shelters based on predetermined parameters. In at least some embodiments, the machine learning module 110 includes one or more models (not shown) therein that approximate a real-world environment based on the data resident within the computing system 100 and incoming data, both discussed further herein. The machine learning module 110 is discussed further herein. Moreover, the computing system 100 includes an image processing module 112 resident within the memory device 104 that is configured to receive satellite images 114 and generate satellite imaging data 116 for further use as described further herein. Accordingly, the computing system 100 includes a plurality of modules resident within the memory device 104 that facilitate searching for the shelters with machine learning features.

Machine learning (ML) systems process large volumes of data, seemingly related or unrelated, where the ML systems may be trained with data derived from a database or corpus of knowledge. The ML systems look for and determine patterns, or lack thereof, in the data, "learn" from the patterns in the data, and ultimately accomplish tasks without being given specific instructions. In addition, the ML systems, utilize algorithms, represented as machine processable models, to learn from the data and create foresights based on this data.

In at least some embodiments, the computing system includes a storage device 120 communicatively coupled to the memory device 104 and the processing device 102 through the bus 106. The storage device 120 houses a knowledge base 122 that includes one or more databases (not shown) that house and retain the collected data used to determine the shelter recommendations for transmission to the two-wheeler drivers.

In some embodiments, the knowledge base 122 includes historical shelter data 124 that includes data collected from sources that include, without limitation, satellite imaging data 116 of the shelters. In addition, in some embodiments, at least a portion of the shelter information collected and stored as the historical shelter data 124 may include, without limitation, historical data such as previous use of the respective shelters by drivers of two-wheeler vehicles. In at least one embodiment, at least a portion of the historical shelter data 124 is provided by historical GPS data collected from one or more of the user's mobile phones (or other mobile computing devices) and GPS devices on the two-wheeler vehicles. Furthermore, in one or more embodiments, the historical shelter data 124 will also include infrastructure data such as, and without limitation, human capacity, vehicle capacity, amenities (e.g., vending machines, rest facilities), user ratings and comments, and weather protection details (e.g., enclosures). The shelter information collected will be specific to two-wheeler vehicles due to the special considerations with respect to the exposure of the respective riders to the elements. Accordingly, the knowledge base 122 includes at least a portion of the data that is used to generate the recommendations for shelters to the two-wheeler drivers.

In at least some embodiments, the knowledge base includes historical GPS data 125 that includes historical data collected from users' GPS devices on the respective mobile phones and vehicular GPS devices.

In some embodiments, the knowledge base 122 houses historical localized weather conditions data 126 that includes historical data including, without limitation, standard weather patterns for the associated regions, known rainfall levels and snowfall levels for the established weather patterns, and known wind speeds for those weather patterns. In some embodiments, the historical localized weather conditions data 126 are used by the machine learning module 110 to generate predictions of the localized weather and the machine leaning module 110 learns from the outcomes of the predictions from the additional real-time data as described herein to continuously improve the weather forecasting abilities. In at least one embodiment, the knowledge base 122 receives additional data for storage and processing by the processing unit 102. In some embodiments, the data is received by the memory device 104 and is subsequently stored in the knowledge base 122.

The additional data received by the knowledge base 122 includes two-wheeler users' mobile phones GPS data 130 from a global positioning device 131 embedded within a mobile computing device associated with the two-wheeler vehicles. Also, the additional data includes two-wheeler users' vehicle sensors GPS data 132 transmitted from a global positioning device 133 embedded within the two-wheeler vehicles. Further, the additional data includes non-two-wheeler users' phone GPS data 134 transmitted from a global positioning device 135 embedded within a mobile computing device associated with the non-two-wheeler vehicles. Moreover, the additional data includes non-two-wheeler users' vehicle sensors GPSs data 136 transmitted from a global positioning device 137 embedded within the non-two-wheeler vehicles. Furthermore, in some embodiments, the additional data received by the knowledge base 122 includes, without limitation, user data 140, real-time localized weather conditions 142, real-time localized road conditions 144, and real-time localized traffic conditions 146. Accordingly, the knowledge base 122 receives additional data that is used to generate the recommendations for shelters to the two-wheeler drivers.

In at least some embodiments, the computer system 100 includes a plurality of data inputs. The two wheeler users' mobile phones GPS data 130 and the two-wheeler users' vehicle sensors GPS data 132 includes the geographic position data and the vehicle speed data of the two-wheeler users and their vehicles in real-time as they traverse the respective thoroughfares. Similarly, the non-two-wheeler users' phone GPS data 134 and non-two-wheeler users' vehicle sensors GPSs data 136 includes the geographic position data and vehicle speed data of the non-two-wheeler users and their vehicles in real-time as they traverse the respective thoroughfares. The non-two-wheeler data and the two-wheeler data are distinguished from each other at the origin of the data signals. In some embodiments, the users' mobile phones are configurable to transmit the respective GPS signals therefrom that indicate the type of vehicle being driven, including through a mobile phone app configured to provide the user interface for the system as described herein. Additionally, in some embodiments, similar data may be broadcast from the GPS devices typically found in (or, in the case of two-wheeler vehicles, on) most modern vehicles. Accordingly, position data for the two-wheeler vehicles and the non-two-wheeler vehicles are transmitted from the users' devices to the knowledge base 122 in real-time.

Further, in some embodiments, the computer system 100 receives user data 140. The user data 140 includes that data specific to the user, and in some embodiments, the vehicle data. For example, and without limitation, the users have the ability to input data such as driving habits and technical details of the vehicle, including, without limitation, the type of vehicle and the number of wheels.

In at least some embodiments, the knowledge base 122 includes historical localized road and traffic conditions data 128 that is accumulated from real-time and predicted localized weather conditions 142, real-time and predicted localized road conditions 144, and real-time and predicted localized traffic conditions 146.

Furthermore, in at least some embodiments, additional real-time and predicted data is input into the computer system 100. Real-time and predicted weather conditions data 142 is received from one or more sources including, without limitation, localized and national weather services, commercially available weather reporting outlets (e.g., local commercial radio stations), and mobile phone-based weather apps. In addition, in some embodiments, real-time localized road conditions data 144 and real-time localized traffic conditions data 146 are collected from sources similar to those for the weather (real-time) as well as data collected from users' and vehicles' sensors within a predetermined time frame prior to the present time. In some embodiments, historic data for the localized road conditions and traffic conditions 128 are stored in the knowledge bases for the purpose of establishing a relationship between known weather conditions and the traffic and road conditions as a function thereof. Accordingly, localized weather, traffic, and road conditions are sued by the computer system 100 to facilitate determining the best shelters available to the users.

The computing system 100 is configured to generate an output 150, discussed further herein.

Figure 2:
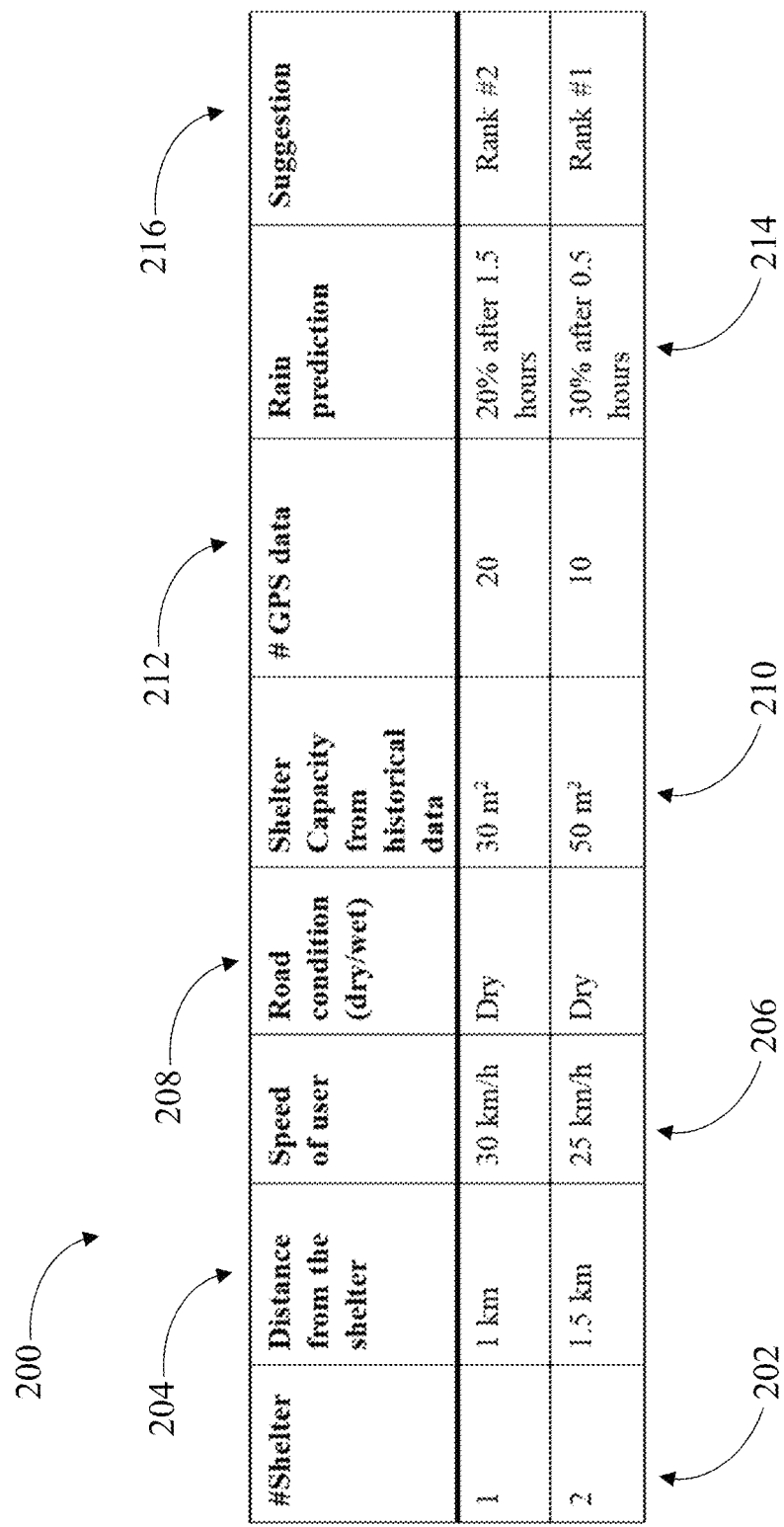
FIG. 2 is a table illustrating an array of information that includes suggested shelters, in accordance with some embodiments of the present disclosure.

Referring to FIG. 2, a table 200 is provided illustrating an array of information that includes suggested shelters, in accordance with some embodiments of the present disclosure. In some embodiments, the table 200 is the output 150 transmitted to the mobile device of the user. In some embodiments, the table 200 includes the information shown in FIG. 2. In other embodiments, the table 200 includes less or more information as compared to that shown in FIG. 2. In yet further embodiments, the table 200 includes only the ranking of the shelters. In some embodiments, the output 150 of the table 200 is configurable by the user. In some embodiments, the machine learning module 110 formulates the output 150 of the table 200 as a result of learning the preferences of the user over time.

As shown in FIG. 2, the table 200 includes a "#Shelter" column 202 that lists the shelters as vertically downwardly ascending integers. The assigned integers have no relationship to the ranking of the shelters. The table 200 also includes a "Distance from the shelter column" 204 that indicates the real-time distance between the present position of the two-wheeler rider and the respective shelter. In one embodiment, the units of the distance are metric, e.g., kilometers (km), and in other embodiments, the units of the distance are Imperial system units, e.g., miles. The table 200 further includes a "Speed of user" column 206 that indicates the average speed the user must maintain to reach the respective shelter prior to the arrival of the pending inclement weather, where the units are consistent with the column 204. In addition to the column 206, some embodiments of the table 200 include the time to reach the shelter given the respective speed and distance.

The table 200 also includes the "Road condition (dry/wet)" column 208 that represents the present condition of the roadway between the present position and the respective shelter. The table 200 further includes a "Shelter Capacity from historical data" column 210 that indicates the physical size of the respective shelter, where the units are consistent with those of columns 204 and 206. In some embodiments, the table 200 indicates the maximum permitted occupant capacity. The table 200 also includes a "#GPS data" column 212 that indicates the present number of other two-wheeler riders presently located at the respective shelters. The table 200 further includes a "Rain prediction" column 214 that provides the user with a prediction of pending rain. In some embodiments, the column 214 is determined by the machine learning module 110 as a function of the historical localized weather conditions data 126 relevant for the time of year, recent weather patterns, and real-time and predicted localized weather conditions data 142. For example, and without limitation, rather than a rain prediction, the table 200 includes one or more of a wind prediction column, a snow prediction column, a fog prediction column, a hail prediction column, and a sleet/freezing rain precipitation column.

The table 200 also includes a "Suggestion" column 216 that provides a ranking of the shelters. In the embodiment shown in FIG. 2, the ranking of the second shelter as the highest ranked shelter is at least partially based on the greater shelter capacity and the lower number of users presently there. In one situation, the user will select one of the shelters and the computer system 100 will be notified of the selection. In other situations, the user will select a shelter not suggested through either transmitting a shelter not suggested to the computer system 100 or simply traveling to an alternate site. In yet further situations, the user will make no shelter selection. Regardless of the user's selections, the machine learning module 110 will use that selection information to facilitate future suggestions. Accordingly, the output 150 of the computer system 100 in the form of a table 200 provides the user with the information necessary to facilitate a selection of a shelter.

Figure 3:
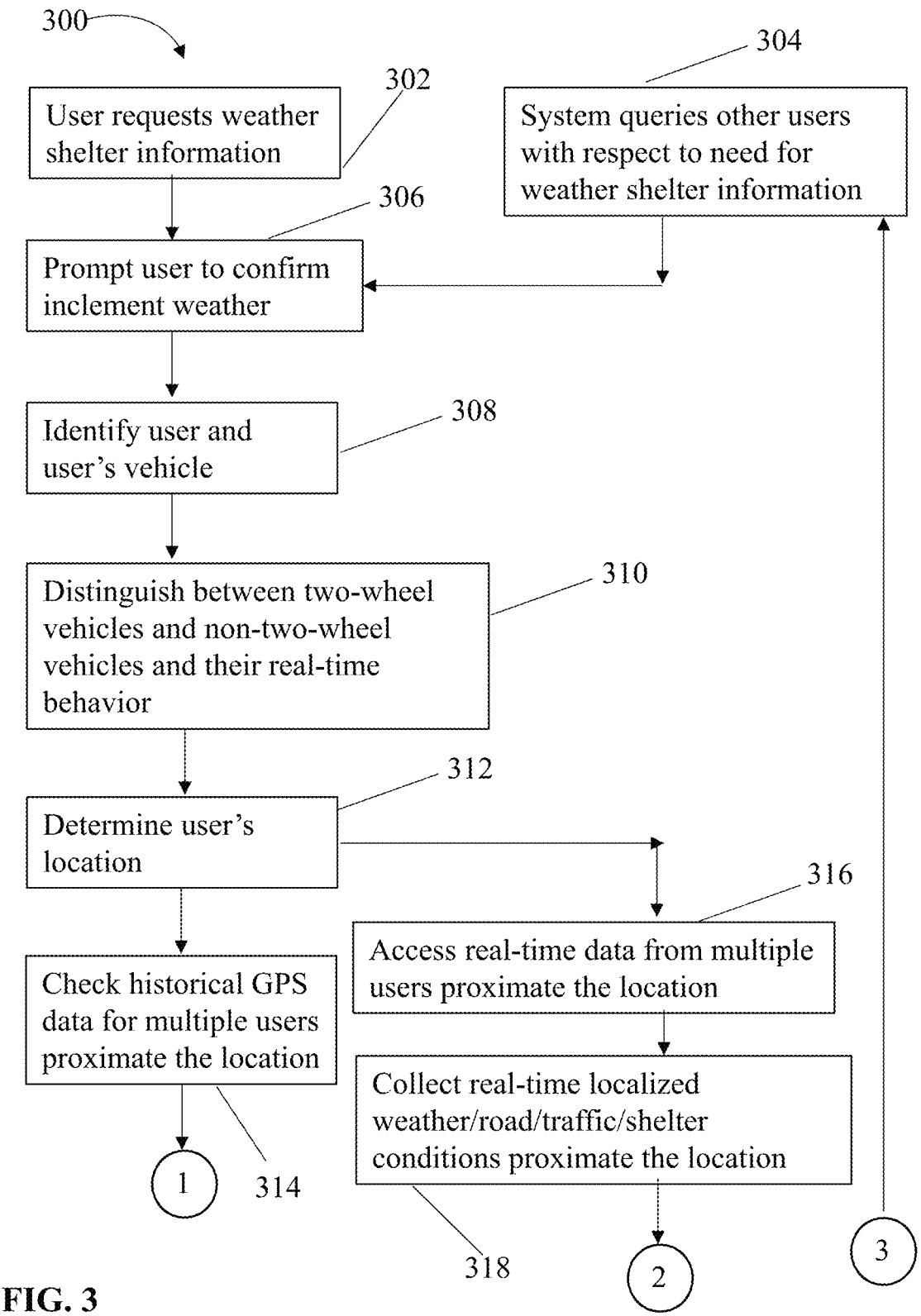
FIG. 3 is a flow chart illustrating a process for determining shelter areas for two-wheeler vehicles, and, more specifically, for dynamically distinguishing the behavior of two-wheeler vehicles and non-two-wheeler vehicles as an indicator of shelter areas from inclement weather, in accordance with some embodiments of the present disclosure.
Figure 3:
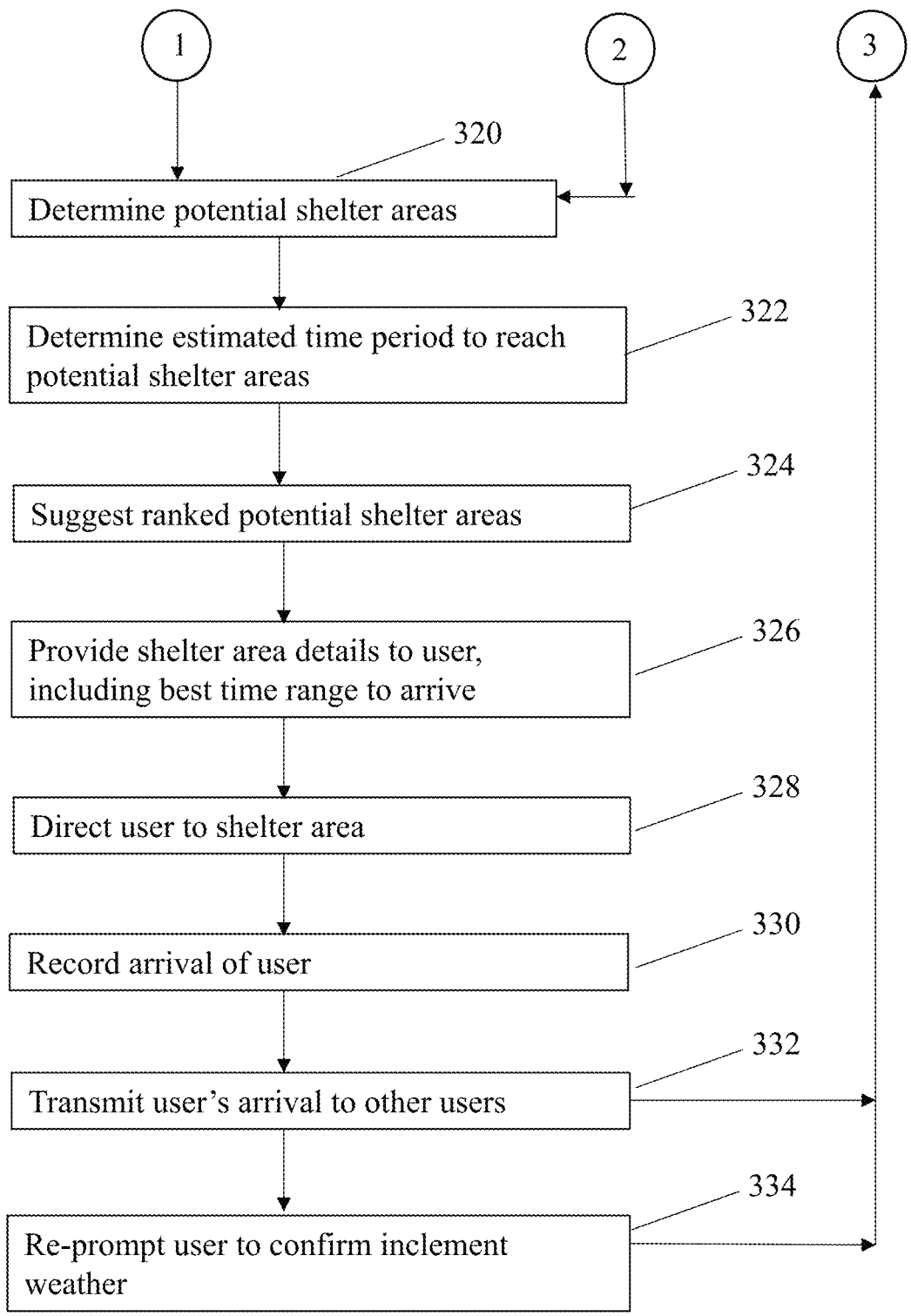

Referring to FIG. 3, and referring to FIG. 1, a flow chart is provided illustrating a process 300 for determining shelter areas for two-wheeler vehicles through dynamically determining inclement weather, and further dynamically determining navigation and shelter information in view of the inclement weather. A first user of the computer system 100, i.e., a first rider of a two-wheeler vehicle requests 302 weather shelter information through the associated application resident on their mobile phone. The first rider may be prompted to perform the request operation 302 through one or more of real-time visual cues, an alert through the mobile phone, or previous knowledge of pending weather patterns.

In at least one embodiment, and in parallel with the request operation 302, the computer system 100 queries 304 to second users of two-wheeler vehicles and third users of non-two-wheeler vehicles with respect to a need for weather shelter information. In such embodiments, the computer system 100 is prompted to execute the query operation 304 in response to one or more of the first user request operation 302, a plurality of second user request operations 302 that meet or exceed a predetermined trigger level, the machine learning module 110 recognizing pending inclement weather as a function of some combination of the real-time and predicted localized weather conditions data 142, historical localized weather conditions data 126, and satellite imaging data 116.

In response to either, or both of, the request operation 302 and the query operation 304, the computer system 100 will prompt 306 the first user to confirm the inclement weather conditions. As described elsewhere herein, other weather conditions may also be the subject requiring the prompting operation 306. In some embodiments, the prompt operation 306 is transmitted to all users within a predetermined proximity of the first user. At least a portion of the users will respond appropriately. The first user and associated two-wheeler vehicle will be identified 308, since the first user's identity and details of the two-wheeler vehicle are resident within the knowledge base 122 as user data 140. Similar identification operations directed toward the plurality of second users and third users to that of the identification operation 308 of the first user is performed as well. In at least some embodiments, the identification is performed automatically by the computer system 100 as a function of the first, second, and third users that have the mobile phones turned on, with the GPS features enabled, or vehicular GPSs enabled.

As a result of the identification of the first, second, and third users and their vehicles, the computer system 100 distinguishes 310 between the two-wheel vehicles and the non-two-wheel vehicles at least partially as a function of their observed and recorded real-time behavior. The machine learning module 110 distinguishes the behavior of the first and second users with the two-wheeler vehicles from the third users in the non-two-wheeled vehicles. For example, the first and second users will likely be slowing down the two-wheeler vehicles in inclement weather, and quite possibly stopping, while the third users will slow down to a lesser extent or not slow at all.

In at least some embodiments, the first indication to the computing system 100 of inclement weather affecting the two-wheeler vehicles may be the distinguishing 310 the behaviors between the two-wheeler and non-two-wheeler vehicles. Distinguishing 310 between the two-wheel vehicles and the non-two-wheel vehicles includes determining a first status of the plurality of first two-wheeler vehicles. For example, the computer system 100 will receive indications that a group of two-wheeler vehicles is slowing down and stopping to gather at a similar location. Therefore, the first status of the first two-wheeler vehicles is stopped. Proximate the location of the stopped two-wheeler vehicles, a second status of a plurality of non-two-wheeler vehicles is one or more non-two-wheeler vehicles of the plurality of non-two-wheeler vehicles moving proximate the stopped two-wheeler vehicles. Based on the differing statuses between the two types of vehicles, the computing system 100 will determine the proximate location is a shelter from inclement weather for the two-wheeler vehicles.

The computer system 100 will accurately determine 312 the first user's geographic location to more precisely determine the ranking of potential shelters in subsequent operations. Once the first user's geographic location is established, the computer system 100 will check 314 historical GPS data 125 for multiple users proximate the location in the knowledge base 122. In addition, the computer system 100 will access 316 real-time data from multiple users proximate the location. Specifically, real-time data from the first users, the second users, and the third users includes one or more of two-wheeler users' phone GPSs data 130, two-wheeler users' vehicle sensors GPSs data 132, non-two-wheeler users' phone GPSs data 134, and the non-two-wheeler users' vehicle sensors GPSs 136, is accessed 316. In addition, the computer system 100 will collect 318 real-time localized weather, road, traffic, and shelter conditions proximate the location. Specifically, the computer system 100 will collect and access one or more of real-time and predicted localized weather conditions 142, real-time and predicted localized road conditions data 144, and real-time and predicted localized traffic conditions 146, proximate the location determined in the users' location determination operation 312, is collected 318. In some embodiments, in addition to real-time and predicted data, the computer system will collect and access one or more of historic localized weather conditions 126 and historical localized road and traffic conditions 128.

Once the historical GPSs data 125 is checked 314, the real-time GPSs data 130, 132, 134, and 136 is accessed 316, and the real-time localized conditions data for weather, road, and traffic (142, 144, and 146, respectively) are collected, the computer system 100 through the search module 108 determines 320 potential shelter areas that are within a predetermined distance from the location determined in operation 312. In some embodiments, the predetermined distance is at least partially based on one or more of the known real-time and predicted weather, road, and traffic conditions (142, 144, and 146, respectively), the historical shelter data 124, and the historical GPS data 125, that includes, without limitation, historical users' choices for shelters and vehicular speeds for the various conditions. For example, and without limitation, the historical user speed is 50 km/hour and the predicted inclement weather is approximately one hour in the future, the search module 108 will select potential shelters within 50 km of the present position.

Once the potential shelter areas are determined 320, the computer system 100 then determines 322 the estimated time period to reach each of the potential shelter areas. The time determination operation 322 is at least partially based on one or more of the known real-time and predicted weather, road, and traffic conditions (142, 144, and 146, respectively), the historical shelter data 124, and the historical GPS data 125, that includes, without limitation, historical users' choices for vehicular speeds for the various conditions.

Referring to FIG. 2 in addition to FIGS. 1 and 3, the machine learning module 110 suggests 324 ranked potential shelter areas. In at least one embodiment, the computer system 100 provides the output 150 in the form of the table 200, where the search module 108 searches for and finds the potential shelters, and the machine learning module 110 applies the learned behaviors of each of the users, including the first user, at least partially as a function of the learned conditions and predicted inclement weather patterns to determine the shelter ranking. In addition to the shelter ranking, the computer system 100 provides 326 the shelter area details to the first user, including the best time range to arrive. The additional details may be a portion of the output 150 in the form of the table 200. The best time to arrive output is at least partially based on the distance to the shelter (see column 204 of table 200), the present and anticipated speed of the first user (see column 206 of the table 200), the shelter capacity (see column 210 of the table 200), and the number of known GPS data providers that are already at the shelter (see column 212 of the table 200), and the number of possible users, in addition to the first user, that may be, or are, travelling to the respective shelter.

The first user will determine and select the shelter of choice from the set of ranked shelters (see column 216 of table 200) and the machine learning module 110 will record the decision and monitor the first user's travel details to the selected shelter for learning and future application to subsequent weather-driven events. In at least some embodiments, the machine learning module 110 will direct 328 the first user to the shelter area through providing directions for driving from the present location to the shelter. In some embodiments, such directions may be through existing map/directions applications readily available for mobile phones, or the computer system 100 may include a map/directions module that interacts seamlessly with the machine learning module 110. The directions may be at least partially based on, in some embodiments, known driving behaviors of the users, including the first user, as recorded within the historical GPS data 125, user data 140, the known real-time and predicted localized weather conditions data 142, road conditions 144, and traffic conditions 146. Upon arrival of the first user at the shelter area as determined through the two-wheeler users' phone GPS data 130 and/or the two-wheeler users' vehicle sensors GPS data 132, the machine learning module 110 will record 330 the arrival of the first user and the route taken for future use. The computer system 100 will transmit 332 the first user's arrival to other users and the process 300 will return to the system queries operation 304. In some embodiments, the process 300 will proceed to re-prompting the first user to confirm the inclement weather conditions 334 and then return to the system queries operation 304.

In at least some embodiments, the machine learning module 110 may have sufficient learning to manage the population of the respective shelters. For example, the machine learning module 110 provides in table 200 the present number of the population of other two-wheeler riders presently located at the respective shelters in the "#GPS data" column 212. In addition, as described elsewhere herein, the computer system 100 provides 326 the shelter area details to the first user, including the best time range to arrive. and the number of possible users on the two-wheeler vehicles, in addition to the first user, that may be, or are, travelling to the respective shelter as directed, thereby directing the one or more two-wheeler vehicles to the shelter within a determined time frame The computer system 100 may adjust the ranking of the shelters based on the known and anticipated population levels of the two-wheeler vehicles at the shelter. Moreover, the machine learning module 110 will record 330 the arrival of the first user to add such user and the associated two-wheeler vehicle to the monitored population.

Figure 4:
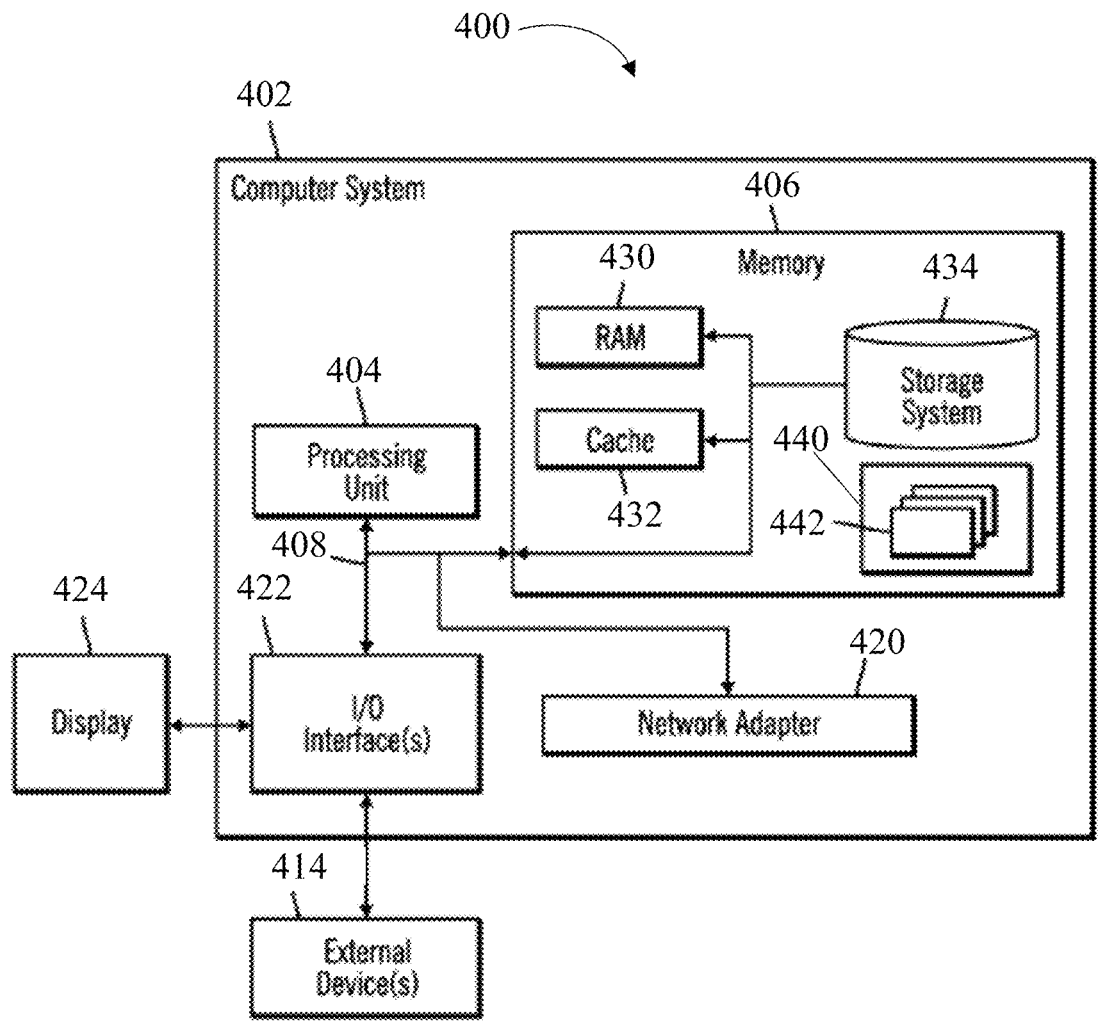
FIG. 4 is a block diagram illustrating a computer system/ server of a cloud-based support system, to implement the processes described above with respect to FIGS. 1-3, in accordance with some embodiments of the present disclosure.

Aspects of the computing system 100 may be embodied in a computer system/server in a single location, or in at least one embodiment, may be configured in a cloud-based system sharing computing resources. With reference to FIG. 4, a block diagram is provided illustrating an example of a computer system 400 including a computer/server 402, hereinafter referred to as a host 402 in communication with a cloud based support system, to implement the system, tools, and processes described above with respect to FIGS. 1-3. Host 402 is operational with numerous other general purpose or special-purpose computer system environments or configurations. Examples of well-known computer systems, environments, and/or configurations that may be suitable for use with host 402 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host 402 may be described in the general context of computer system-executable instructions, such as program modules, being executed by a computer system. Generally, program modules may include routines, programs, objects, components, logic, data structures, and so on that perform particular tasks or implement particular abstract data types. Host 402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, host 402 is shown in the form of a general-purpose computing device. The components of host 402 may include, but are not limited to, one or more processors or processing devices or units 404, e.g. hardware processors, a system memory 406, and a bus 408 that couples various system components including system memory 406 to processing device 404. Bus 408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host 402 typically includes a variety of computer system readable media. Such media may be any available media that is accessible by host 402 and it includes both volatile and non-volatile media, removable and non-removable media.

Memory 406 can include computer system readable media in the form of volatile memory, such as random access memory (RAM) 430 and/or cache memory 432. By way of example only, a storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 408 by one or more data media interfaces.

Program/utility 440, having a set (at least one) of program modules 442, may be stored in memory 406 by way of example, and not limitation, as well as an operating system, one or more application programs, other program modules, and program data. Each of the operating systems, one or more application programs, other program modules, and program data or some combination thereof, may include an implementation of a networking environment. Program modules 442 generally carry out the functions and/or methodologies of embodiments to dynamically determine shelter areas for two-wheeler vehicles through dynamically determining inclement weather, and further dynamically determining navigation and shelter information in view of the inclement weather is enabled. For example, the set of program modules 442 may include the search module 108, the machine learning module 110, and the image processing module 112, as described in FIGS. 1-3.

Host 402 may also communicate with one or more external devices 414, such as a keyboard, a pointing device, etc.; a display 424; one or more devices that enable a user to interact with host 402; and/or any devices (e.g., network card, modem, etc.) that enable host 402 to communicate with one or more other computing devices. Such communication can occur via Input/Output (I/O) interface(s) 422. Still yet, host 402 can communicate with one or more networks such as a local area network (LAN), a general wide area network (WAN), and/or a public network (e.g., the Internet) via network adapter 420. As depicted, network adapter 420 communicates with the other components of host 402 via bus 408. In at least one embodiment, a plurality of nodes of a distributed file system (not shown) is in communication with the host 402 via the I/O interface 422 or via the network adapter 420. It should be understood that although not shown, other hardware and/or software components could be used in conjunction with host 402. Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory 406, including RAM 430, cache memory 432, and storage system 434, such as a removable storage drive and a hard disk installed in a hard disk drive.

Computer programs (also called computer control logic) are stored in memory 406. Computer programs may also be received via a communication interface, such as network adapter 420. Such computer programs, when run, enable the computer system to perform the features of the present embodiments as discussed herein. In particular, the computer programs, when run, enable the processing device 404 to perform the features of the computer system. As such, computer programs may represent controllers of the computer system. Accordingly, the functionality for the search module 108, the machine learning module 110, and the image processing module 112, as described in FIGS. 1-3, is embodied as computer program code stored in memory 406 (in some embodiments as program modules 442), where the computer program code includes the instructions to be executed by the processing device 404 to provide the functionality of the search module 108, the machine learning module 110, and the image processing module 112, as described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as JAVA®, SMALLTALK®, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments. Accordingly, the functionality for the search module 108, the machine learning module 110, and the image processing module 112, as described in FIGS. 1-3, may be embodied as computer readable program instructions to be executed by one or more hardware devices other than, or in addition to, the processing device 404 to provide the functionality of the search module 108, the machine learning module 110, and the image processing module 112, as described herein.

In at least one embodiment, host 402 is a node of a cloud computing environment. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
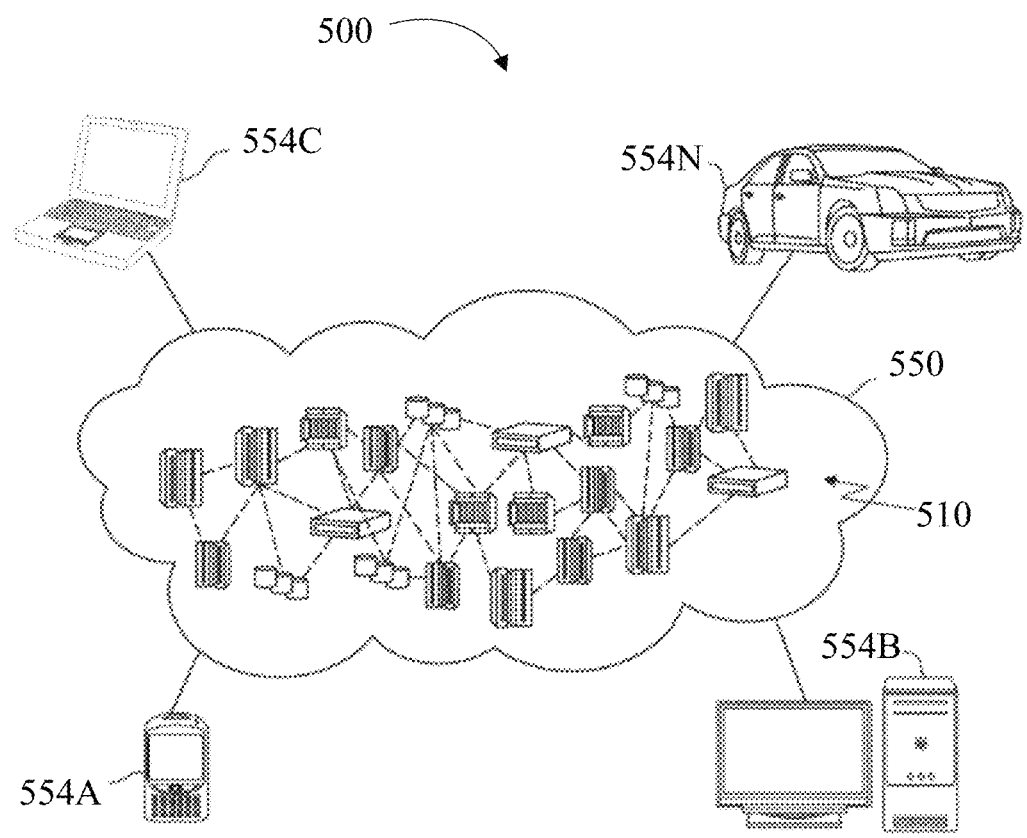
FIG. 5 is a schematic diagram illustrating a cloud computer environment, in accordance with some embodiments of the present disclosure.

Referring now to FIG. 5, a schematic diagram is provided illustrating an example cloud computing network 500. As shown, cloud computing network 500 includes a cloud computing environment 550 having one or more cloud computing nodes 510 with which local computing devices used by cloud consumers may communicate. Examples of these local computing devices include, but are not limited to, personal digital assistant (PDA) or cellular telephone 554A, desktop computer 554B, laptop computer 554C, and/or automobile computer system 554N. Individual nodes within nodes 510 may further communicate with one another. They may be grouped (not shown) physically or virtually, in one or more networks, such as Private, Community, Public, or Hybrid clouds as described hereinabove, or a combination thereof. This allows the cloud computing network 500 to offer infrastructure, platforms and/or software as services for which a cloud consumer does not need to maintain resources on a local computing device. It is understood that the types of computing devices 554A-N shown in FIG. 5 are intended to be illustrative only and that the cloud computing environment 550 can communicate with any type of computerized device over any type of network and/or network addressable connection (e.g., using a web browser).

Figure 6:
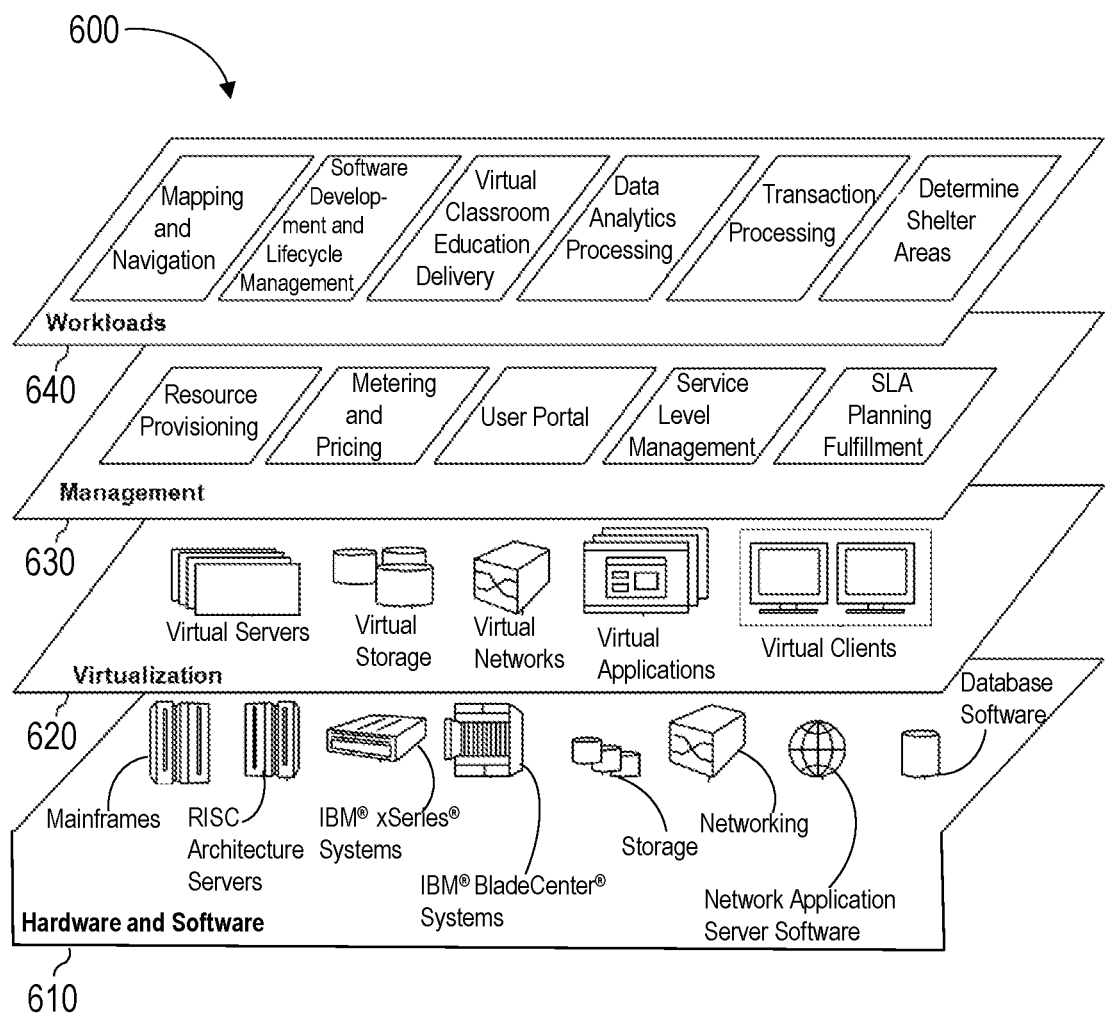
FIG. 6 is a block diagram illustrating a set of functional abstraction model layers provided by the cloud computing environment, in accordance with some embodiments of the present disclosure.

Referring now to FIG. 6, a set of functional abstraction layers 600 provided by the cloud computing network of FIG. 6 is shown. It should be understood in advance that the components, layers, and functions shown in FIG. 6 are intended to be illustrative only, and the embodiments are not limited thereto. As depicted, the following layers and corresponding functions are provided: hardware and software layer 610, virtualization layer 620, management layer 630, and workload layer 640.

The hardware and software layer 610 include hardware and software components. Examples of hardware components include mainframes; RISC (Reduced Instruction Set Computer) architecture-based servers; servers; blade servers; storage devices; networks and networking components. Examples of software components include network application server software, and database software.

Virtualization layer 620 provides an abstraction layer from which the following examples of virtual entities may be provided: virtual servers; virtual storage; virtual networks, including virtual private networks; virtual applications and operating systems; and virtual clients.

In one example, management layer 630 may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer 640 provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and determining shelter areas for two-wheeler vehicles, and, more specifically, for dynamically determining inclement weather, and further dynamically determining navigation and shelter information in view of the inclement weather.

It will be appreciated that there is disclosed herein a system, method, apparatus, and computer program product for implementing loop lock reservations across loops, and, more specifically, for holding a loop lock reservation across some or all of the iterations of a loop, and under certain conditions, to temporarily effect a running thread to yield the reservation and allow other threads to reserve the lock.

While particular embodiments of the present disclosure have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of a computer-based system or platform.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Accordingly, the scope of protection of the embodiments is limited only by the following claims and their equivalents.

What is claimed is:

1. A computer system comprising:
   one or more processing devices;
   one or more memory devices communicatively coupled to the one or more processing devices;
   a knowledge base communicatively coupled to the one or more processing devices and the one or more memory devices, the knowledge base configured to retain collected data resident therein;
   wherein the knowledge base and the one or more memory devices are communicatively coupled to a plurality of positioning devices, each positioning device of the plurality of positioning devices associated with one of:
      a two-wheeler vehicle; and
      a non-two-wheeler vehicle;
   wherein the knowledge base is configured to receive location information from the plurality of positioning devices;
   wherein the one or more processors are configured to:
      use the location information to determine a first location, wherein a plurality of first two-wheeler vehicles are proximate the first location, a first status of the plurality of first two-wheeler vehicles is the plurality of first two-wheeler vehicles is not moving;

use the location information to determine that a second status of a plurality of non-two-wheeler vehicles is one or more non-two-wheeler vehicles of the plurality of non-two-wheeler vehicles is moving proximate the first location;
determine, subject to the first status and the second status, the first location is a shelter from inclement weather;
use at least a portion of the collected data resident within the knowledge base to identify inclement weather proximate the first location; and
transmit identification of one or more shelters to the one or more second two-wheeler vehicles.

2. The system of claim 1, wherein the knowledge base is further configured to receive location data from one or more of:
a global positioning device embedded within a mobile computing device associated with one first two-wheeler vehicle of the plurality of first two-wheeler vehicles;
a global positioning device embedded within one first two-wheeler vehicle of the plurality of first two-wheeler vehicles;
a global positioning device embedded within a mobile computing device associated with one non-two-wheeler vehicle of the plurality of non-two-wheeler vehicles; and
a global positioning device embedded within one non-two-wheeler vehicle of the plurality of non-two-wheeler vehicles.

3. The system of claim 1, wherein at least a portion of the collected data resident within the knowledge base includes one or more of:
one or more of historical, real-time, and predicted weather conditions;
one or more of historical, real-time, and predicted traffic conditions; and
one or more of historical, real-time, and predicted road conditions.

4. The system of claim 1, wherein the one or more processing devices are further configured to:
notify one or more second two-wheeler vehicles of the shelter;
direct the one or more second two-wheeler vehicles toward the shelter; and
estimate a time period for the one or more second two-wheeler vehicles to travel from one or more respective second locations to the first location.

5. The system of claim 4, wherein the one or more processing devices are further configured to:
rank each shelter of the one or more shelters.

6. The system of claim 1, wherein the one or more processing devices are further configured to:
manage a population of the plurality of first two-wheeler vehicles.

7. The system of claim 6, wherein the one or more processing devices are further configured to:
determine a present population of the two-wheeler vehicles at the shelter;
determine a number of the two-wheeler vehicles being directed toward the shelter;
record an arrival of the one or more two-wheeler vehicles at the shelter;
rank a plurality of shelters at least partially subject to an anticipated population of the two-wheeler vehicles at the shelter; and
direct the one or more two-wheeler vehicles to the shelter within a determined time frame.

8. The system of claim 1, wherein the one or more processing devices are further configured to:
prompt users of the one or more two-wheeler vehicles to report real-time weather conditions proximate the shelter.

9. A computer program product for determining shelter areas for two-wheeler vehicles, the computer program product comprising:
one or more computer readable storage media; and
program instructions collectively stored on the one or more computer-readable storage media, the program instructions comprising:
program instructions to use location information transmitted from a plurality of positioning devices to determine a first location, wherein a plurality of first two-wheeler vehicles are proximate the first location;
program instructions to use the location information to determine that a first status of the plurality of first two-wheeler vehicles is the plurality of first two-wheeler vehicles is not moving;
program instructions to use the location information to determine that a second status of a plurality of non-two-wheeler vehicles is one or more non-two-wheeler vehicles of the plurality of non-two-wheeler vehicles are moving proximate the first location;
program instructions to determine, subject to the first status and the second status, the first location is a shelter from inclement weather;
program instructions to use at least a portion of collected data resident within a knowledge base to identify inclement weather proximate the first location; and
program instructions to transmit identification of one or more shelters to the one or more second two-wheeler vehicles.

10. The computer program product of claim 9, the program instructions further comprising one or more of:
program instructions to process data from a global positioning device embedded within a mobile computing device associated with one first two-wheeler vehicle of the plurality of first two-wheeler vehicles;
program instructions to process data from a global positioning device embedded within one first two-wheeler vehicle of the plurality of first two-wheeler vehicles;
program instructions to process data from a global positioning device embedded within a mobile computing device associated with one non-two-wheeler vehicle of the plurality of non-two-wheeler vehicles; and
program instructions to process data from a global positioning device embedded within one non-two-wheeler vehicle of the plurality of non-two-wheeler vehicles.

11. The computer program product of claim 9, the program instructions further comprising one or more of:
program instructions to manage a population of the plurality of first two-wheeler vehicles, comprising:
program instructions to estimate a time period for one or more second two-wheeler vehicles to travel from one or more respective second locations to the first location;
program instructions to determine a present population of the two-wheeler vehicles at the shelter;
program instructions to determine a number of the two-wheeler vehicles being directed toward the shelter;
program instructions to record an arrival of the one or more two-wheeler vehicles at the shelter;

program instructions to rank a plurality of shelters at least partially subject to an anticipated population of the two-wheeler vehicles at the shelter; and program instructions to direct the one or more two-wheeler vehicles to the shelter within a determined time frame.

12. A computer-implemented method comprising:

using location information transmitted from a plurality of positioning devices to determine a plurality of first two-wheeler vehicles proximate a first location;

determining that a first status of the plurality of first two-wheeler vehicles is the plurality of first two-wheeler vehicles is not moving;

using the location information to determine that a second status of a plurality of non-two-wheeler vehicles is one or more non-two-wheeler vehicles of the plurality of non-two-wheeler vehicles is moving proximate the first location;

determining, subject to the first status and the second status, the first location is a shelter from inclement weather;

using at least a portion of collected data resident within a knowledge base to identify inclement weather proximate the first location; and transmitting identification of one or more shelters to the one or more second two-wheeler vehicles.

13. The method of claim 12, wherein using the location information transmitted from the plurality of positioning devices comprises using location information transmitted from one or more of:

a global positioning device embedded within a mobile computing device associated with one first two-wheeler vehicle of the plurality of first two-wheeler vehicles;

a global positioning device embedded within one first two-wheeler vehicle of the plurality of first two-wheeler vehicles;

a global positioning device embedded within a mobile computing device associated with one non-two-wheeler vehicle of the plurality of non-two-wheeler vehicles; and a global positioning device embedded within one non-two-wheeler vehicle of the plurality of non-two-wheeler vehicles.

14. The method of claim 12, further comprising:

distinguishing between the plurality of first two-wheeler vehicles and the plurality of non-two-wheeler vehicles based on behavior of the plurality of two-wheeler vehicles and behavior of the plurality of non-two-wheeler vehicles.

15. The method of claim 12, wherein using at least a portion of collected data resident within the knowledge base to identify inclement weather proximate the first location comprises accessing one or more of:

one or more of historical, real-time, and predicted weather conditions;

one or more of historical, real-time, and predicted traffic conditions; and one or more of historical, real-time, and predicted road conditions.

16. The method of claim 12, further comprising:

notifying one or more second two-wheeler vehicles of the shelter;

directing the one or more second two-wheeler vehicles toward the shelter; and estimating a time period for the one or more second two-wheeler vehicles to travel from one or more respective second locations to the first location.

17. The method of claim 16, wherein notifying one or more second two-wheeler vehicles of the shelter from inclement weather comprises:

ranking each shelter of the one or more shelters.

18. The method of claim 12, further comprising:

managing a population of the plurality of first two-wheeler vehicles.

19. The method of claim 18, wherein managing the population of the plurality of the two-wheeler vehicles comprises:

determining a present population of the two-wheeler vehicles at the shelter;

determining a number of the two-wheeler vehicles being directed toward the shelter;

recording an arrival of the one or more two-wheeler vehicles at the shelter;

ranking a plurality of shelters at least partially subject to an anticipated population of the two-wheeler vehicles at the shelter; and directing the one or more two-wheeler vehicles to the shelter within a determined time frame.

20. The method of claim 12, further comprising:

prompting users of the one or more two-wheeler vehicles to report real-time weather conditions proximate the shelter.

* * * * *